United States Patent [19]
MacLeod et al.

[11] 3,898,445
[45] Aug. 5, 1975

[54] DIGITIZING DEVICE

[75] Inventors: Iain Donald Graham MacLeod, Watson; Horst Peter Cantor, Sutton; Stephen Kaneff, Red Hill, all of Australia

[73] Assignee: The Australian National University, Canberra, Australia

[22] Filed: Nov. 26, 1973

[21] Appl. No.: 418,894

[52] U.S. Cl. .......... 235/154; 235/151.3; 250/36; 356/141; 356/147; 33/281; 33/125 A
[51] Int. Cl.² ............................. G08C 9/06
[58] Field of Search ........... 33/281, 282, 284, 285, 33/125 A; 356/3, 140, 147, 4, 14; 235/61.6 A, 154, 151.3, 92 V; 250/236, 216; 343/79; 178/18, 19

[56] References Cited
UNITED STATES PATENTS

| | | | |
|---|---|---|---|
| 3,457,646 | 7/1969 | Schwemin | 33/1 |
| 3,458,704 | 7/1969 | Cath | 250/209 |
| 3,633,010 | 1/1972 | Svetlichney | 235/151.3 |
| 3,637,309 | 1/1972 | Hosterman | 356/172 |
| 3,791,735 | 2/1974 | Nakazawa et al. | 356/4 |

Primary Examiner—Charles E. Atkinson
Assistant Examiner—Vincent J. Sunderdick

[57] ABSTRACT

A digitizer for determining the relative position of a target in a two- or three-dimensional working environment by measurement of the time taken for a number of light beams to sweep across the environment between known reference points and comparing that time with the time for the beams to sweep from one of the reference points to the target. The light beams are reflected from a light source across the environment by one or more rotating reflectors and the target is marked by a detection pen which is responsive to light of the beam incident on the pen tip.

21 Claims, 7 Drawing Figures

DIGITIZING DEVICE

FIELD OF THE INVENTION

This invention relates to a device for determining the location or orientation of an object in a designated environment and relates particularly to a device for digitizing co-ordinates of a position in the environment so that the positional information can be accepted by a digital computer, numerically controlled machine or other information processing, storage or handling equipment. The data from the digitizer of the invention may be used for information input, control, interactive communication or the like and may be used to transform, for example, map or drawing plots of points, lines, symbols or other details in a two-dimensional environment, or spatial location and orientation of objects in a three-dimension environment, to digital coded information.

DESCRIPTION OF THE PRIOR ART

A number of systems for transforming positional information in either two or three-dimensional environments to digital co-ordinates has been previously proposed. Such previously proposed systems include the following:

a. Electrolyte Systems

These were early two-dimensional devices which used a tray filled with a conductive solution. As the position of a pencil-electrode in the tray was changed, so the resistance between it and the conductive sides of the tray varied. However, the wet solution was messy and corrosive, the accuracy poor and the devices were troubled with electrolysis.

b. Pressure-touch Device

In this system a two-dimensional grid of wires is used and under pressure of a pen, crossing wires touch, or the resistance of plastic material therebetween changes. However, this system can be unreliable as good contact between the wires is difficult to maintain. The system may also be inaccurate because of the limited number of wires.

c. Prick-through Device

This device is rather cumbersome because instead of a pen, a three-legged device is positioned over a plastic insulator and a sharp pin projecting from one of the feet is pushed through the plastic into a resistive coat. These devices are inconvenient to use and do not plot continuous lines. They also have the disadvantage that every point has to be pushed through the plastic insulator.

d. Servomechanism Systems

Such systems may, for example, employ a magnetic follower moved by the operator over the surface of a table, in conjunction with a slave movement (below the table) which is employed to provide X-Y co-ordinates. These devices can be made reasonably accurate but are somewhat sluggish in response.

e. Sound Operated Devices

With this type of device a source of sharp sound such as a spark produced by an electrode mounted on the designated object takes a certain time to reach microphones at known positions. By measuring the arrival time at different microphones, co-ordinates can be worked out. This method is fairly inaccurate, sometimes noisy and is subject to errors due to external noises. Furthermore the speed of operation is limited by the time required for the sound to travel from the source to the microphones.

f. Position Determination by Means of Wires

Three dimensional positions may be determined by measuring the lengths of three or more wires attached to a point on the designated object. The wires are held in tension and their lengths are measured by recording angular positions of takeup drums located outside the working environment In favourable circumstances this technique can be relatively precise, but there is a danger of the wires becoming fouled by objects inside the working environment (or by wires attached to different points if more than one position is to be determined).

g. Elastic-Wave Devices

Two-dimensional positions may be determined by measuring the time of incidence on a detecting transducer of elastic waves generated at the boundaries of an elastic plate. These devices tend to be sensitive to environmental variations and may be adversely affected by any objects coming into contact with the elastic plate.

SUMMARY OF THE INVENTION

There is a need for a system that allows continuous uninterrupted digitizing of two- or three-dimensional positions and/or orientations in such applications as digitization of lines, symbols, figures, pictures or the surfaces of three-dimensional objects, numerical control, determination of an operator's head position and orientation for interactive display functions, and controlled manipulators. A special advantage to aim for is tolerance to environmental distrubances such as temperature changes, loud noises, speech and illumination changes and the ability to work effectively in physically cluttered environments. It is an object of this invention to provide a digitizer having some or all of the above desired features without the disadvantage of the above mentioned prior systems.

It is a further object of the invention to provide a digitizer which is operable to quickly and accurately provide digital positional information relating to the location of an object, or point or line, in a designated environment.

A further object of the invention is to provide a digitizer which is simple to operate and relatively inexpensive to manufacture.

According to the invention there is provided a digitizing device comprising means for generating at least one beam of light; means to cause the beam, or two or more beams of light, to sweep a working environment from different directions, at least one light-sensitive means adapted to give rise to an electrical signal when intercepted by a light beam in the working environment and means for detecting the position in the working environment relative to the light beam sweeps, said position detecting means including means to relate the electrical signal of the light-sensitive means to the relative position of the light beam during each sweep through the working environment.

The digitizer has been realised with beams of light (whose wavelength may encompass the visible as well as ultra-voilet or infra-red portions of the spectrum) and photo-electronic recognition. If a working environment is swept by a combination of beams from different angles or points or origin and if the bearing of such beams can be worked out at the moment of striking one or more small targets in the environment, then the positions of the targets can be calculated. Omnidirectional sensing of the light beam is a further advantage of this invention, with the resulting relative freedom of orientation of the target. Electronic techniques are used to determine the position of the target accurately.

In the preferred form of the invention the light beam is a laser beam. Laser beams are intense and have low dispersion and the digitizer of this invention which uses laser beams is very accurate. A low-power laser can be used. This is of great advantage as such a laser, because of the beam rotation and consequential lower power at any one location is not dangerous to the unshielded eye and therefore no safety devices have to be worn.

Thus, broadly this invention is concerned with a communication device comprising a working environment, means for sweeping a laser beam over the working environment, means adapted to indicate any position in the working environment, and means for indicating a position indicated when the indicator means are intersected by the light beams.

In a preferred aspect this invention provides a digitizing device comprising means for generating at least one laser beam; means to cause the beam, or two or more beams to sweep a working environment from different directions, at least one light-sensitive means adapted to give rise to an electrical signal when intercepted by a laser beam in the working environment, and means for detecting the position of said light-sensitive means in the working environment relative to the beam sweeps, said position detecting means including means to relate the electrical signal of the light-sensitive means to the relative position of the beam during each sweep through the working environment.

BRIEF DESCRIPTION OF THE DRAWINGS

In order that the invention will be more readily understood two preferred embodiments will now be described with reference to the accompanying drawings, whererein:

FIG. 3 is a cross-sectional view of the detecting pen used in this embodiment to detect the laser beam.

DETAILED DESCRIPTION OF THE PREFERRED EMBODIMENTS

Figure 1:
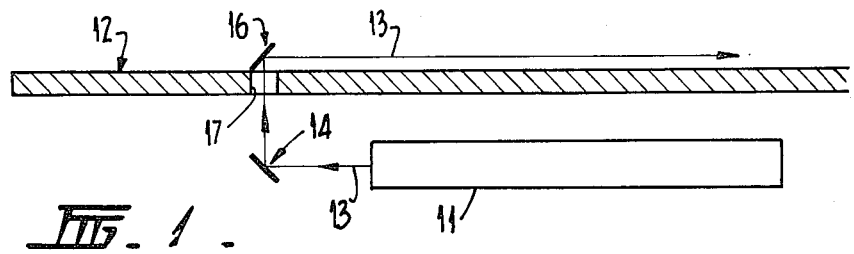
FIG. 1 is a sectional side elevational view of one form of the invention illustrating the manner in which a laser beam is directed over a working surface.

It should be understood that the invention is not limited to the preferred embodiments described with reference to the drawings but encompasses other embodiments falling within the scope of the appended claims.

Referring to FIGS. 1 to 4, a laser 11 is located beneath a plane table 12, (which may be opaque, transparent or translucent — thus enabling images to be seen above or below the working environment), the upper surface of which constitutes the working surface. A beam 13 from the laser 11 is directed by a fixed mirror 14 onto a rotatable mirror 16 through an aperture 17 in the table 12. The rotatable mirror 16 is angled at 45° to the table surface so that the reflected beam 13 sweeps parallel to and close to the table surface. The mirror 16 is rotatable about an axis perpendicular to the table surface, at a constant rate.

In an alternative configuration the fixed laser beam may be directed onto the rotating mirror from above enabling free positioning of the digitizer on the material to be digitized. In such a configuration any convenient plane surface may be used as the working surface.

Figure 2:
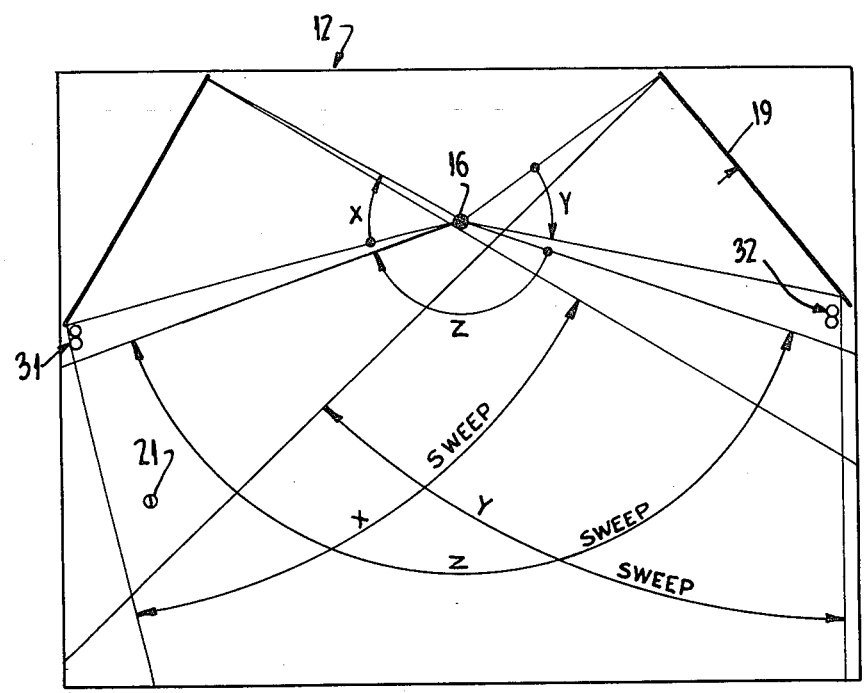
FIG. 2 is a plan view of the working surface of FIG. 1 showing the sweeps of the laser beam over the table.

As shown in FIG. 2, the table has two reflectors 18 and 19 arranged so that the beam 13 from the laser sweeps across the table 12 three times during a single revolution of the mirror 16. The reflectors 18 and 19 are placed so that the beam sweeps intersect each other at as large an angle as possible, preferably nearly 90°, to provide maximum accuracy in detecting a position 21 of a detecting pen on the table surface. The reflectors 18 and 19 are accurately located to maintain the beam 13 parallel and very close to the table surface.

In another arrangement, the rotating beams may be produced directly from two or more rotating mirrors.

In FIG. 2 the three sweeps of the beam 13 across the table in one revolution are indicated as the X-sweep, where the beam 13 is reflected from the reflector 18, the Y-sweep, where the beam 13 is reflected from the reflector 19, and the Z-sweep where the beam sweeps directly across the table between the reflectors 18 and 19.

The detecting pen 24 shown in FIG. 3 has an omnidirectional, matted, translucent tip 26 or part spherical shape coupled to a light pipe 27, the upper end of which bears against a photosensitive semiconductor 28. The part-spherical shape of the tip 26 enables the pen 24 to detect a laser beam striking it through a 360° azimuth and from 0 to at least 45° off the vertical axis. This permits the pen 24 to be handled as a normal writing pen, stylus or the like and obviates the need for special techniques in operating the digitizer.

Light from the laser beam enters the tip 26 and is conveyed to the semiconductor 28 which produces as a result pulsed electrical signals.

The rotating, crosscutting laser beams strike fixed light sensitive diodes 31 and 32 mounted on the table as close as possible to one end of each reflector 18 and 19. The diodes 31 and 32 provide pulsed electrical signal outputs when struck by the laser beam 13 to thereby indicate a mode or direction of sweep of the beams for reference during operation.

Figure 4:
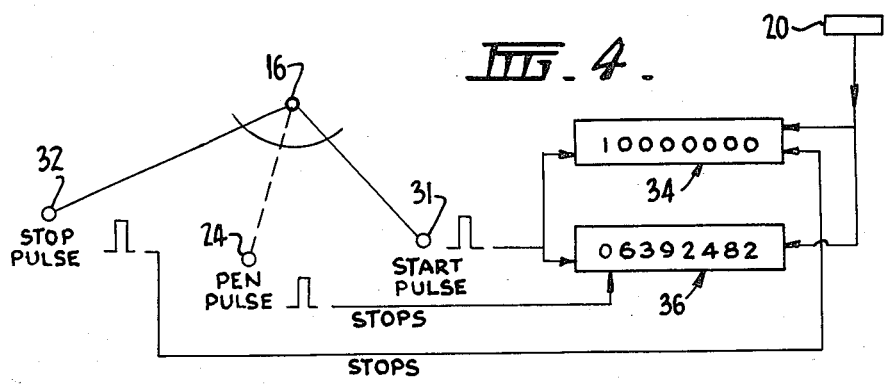
FIG. 4 is a schematic illustration of the method of ascertaining the detecting pen position on the working surface by counting.

Referring to FIG. 4, the operation of the digitizer to detect the pen position on the table during one revolution of the mirror 16 is as follows. A master clock 20 generates a pulsed signal of a constant rate of a few megahertz which is provided to a counting register 34 for the duration of each sweep of the laser beam across the table. The input signal is also fed to an associated register 36 which stores the counts from the start of the sweep to the time when the beam strikes the pen 24. Since the beam 13 has a finite width as has the pen tip 26, the exact centre of the beam is found by slowing the count in register 36 to half its original rate while light from the beam is being detected by the pen. This provides information on the centre of the beam in relation to the pen.

Both the counting registers 34 and 36 are started counting at the megahertz rate by a pulse signal from one of the diodes 31 to the registers indicating the start of a particular sweep. As the beam 13 touches the pen tip 26 the signal therefrom reduces the counting rate until the beam leaves the pen tip 26. At this time the register 36 has a count proportional to the elapsed time of movement of the beam from the position at the diode 31 to the pen position. Register 34 countinues counting until the beam passes the diode 32 at the end of the sweep. Register 34 therefore has a count proportional to the total sweep time. The technique of locating the beam centre referred to above can be used for improving the accuracy of sweep start and finish detection.

Similarly, other registers measure elapsed time for the contra-rotation of the beam 13 moving from diode 32 to diode 31 and for motion of the direct beam from the rotating mirror itself to the pen tip during the other two sweeps of the beam 13 which occur during one revolution of the rotating mirror 16.

The angles swept by the laser beams are therefore digitized by running-up a count during the time it takes from the start of the sweep to the point where the pen is, as against the count for the full sweep from start to finish. The position indicating diodes 31 and 32 mounted on the table together with a logic network designed for the purpose, keep track of each sweep and direct counts from the master clock 20 to the individual registers associated with the particular sweep. The number of bits or counts in the registers is proportional to the time of sweep from its start to the pen position.

The angle can be calculated accurately be comparing the number of counts obtained from the whole sweep (which is always the same angle between start and stop indications from the positional indicating diodes 31 and 32) and the number of counts from the start of that sweep to the position of the pen, which, when hit by the laser beam, will stop counts going into a particular register. In this way there is compensation for variations in the actual speed of sweep.

Electronic circuitry allows a digital computer associated with the digitizer to request data from the registers before initiating a new digitizing cycle.

The logic control of the digitizer, aided by the sequence in which start and stop sweep indicators are contacted by the laser beam, is aware of which sweep is in progress and allows counts to flow into the respective registers.

When all registers (X-sweep and X-angle, Y-sweep and Y-angle and Z-sweep and Z-angle) are filled after a single rotation of the mirror 16 a signal is passed to the digital computer to accept the data. The contents of the registers are made available to the computer over the same bussed data line one after the other. The digitizer will hold any count in any register until the computer signals that it is ready to accept, and on sending out a complete set of data for a position of the pen, will reset all registers and start to fill them with counts for the new pen position.

The location of the detecting pen 24 on the working surface can thereby be accurately determined during one rotation of the mirror 16.

Figure 5:
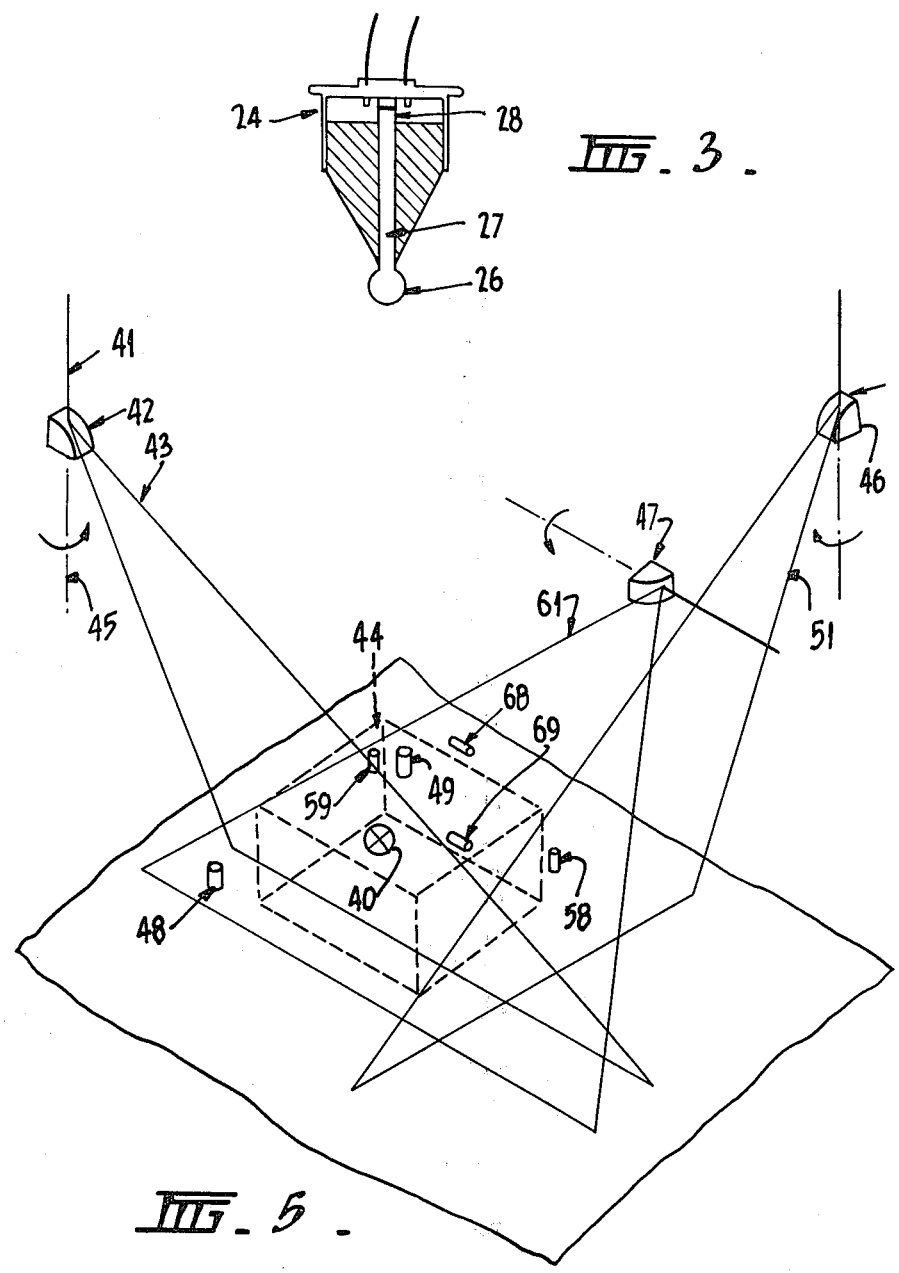
FIG. 5 is schematic perspective illustration of a second form of the invention showing the manner in which a number of laser beams are directed through a three-dimensional working environment.
Figure 7:
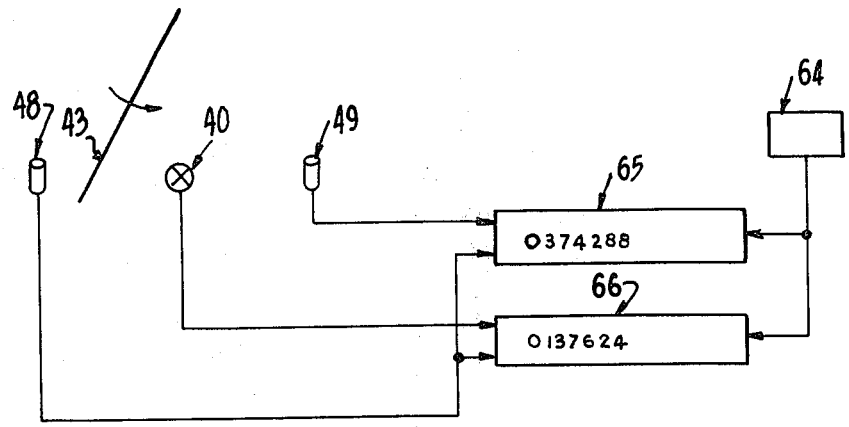
FIG. 7 is a schematic illustration of the method of detecting the location of the target in the working environment relative to known positions by counting.

Referring to FIGS. 5 and 7, a three dimensional digitizer is shown which is arranged to plot the position of a detecting target 40 in a three dimensional working environment. In FIG. 5, a laser beam 41 of circular cross-section is directed onto a rotatable part-cylindrical mirror 42 which is motor driven to sweep the fan-shaped beam 43 formed by the mirror 42 through a working environment 44 about an axis 45. At least two other fan-shaped beams 51, 61 are similarly swept through the environment 44 by additional rotating mirrors 46 and 47. Preferably the mirrors 42, 46, 47 are positioned so that the fan-shaped beams 43, 51, 61 intersect at large angles, for example, about 90° to each other, for the purposes of reducing the sensitivity of target position calculations to small errors in measurement of beam bearings.

A similar fan-shaped beam of appropriate spread directed from a position somewhat above the working surface can be used in the two-dimensional embodiment of this invention to overcome irregularities in the working surface.

The rotating fan-shaped laser beam 43 strikes fixed light sensitive photo diodes 48 and 49 mounted at the periphery of the working environment 44 and used to indicate the start and finish of the sweep of the beam 43 through the environment 44. The field of view of the diodes 48, 49 is restricted to a small solid angle centred on the rotating mirror 42 to avoid the diodes being influenced by other beams.

Similar diodes 58, 59 and 68, 69 are also mounted at the periphery of the working environment 44 for association with the laser beam 51 and 61, respectively, to indicate the start and finish of the sweeps of three laser beams through the environment 44. Each diode produces an electrical signal when struck by the associated laser beam.

Figure 6:
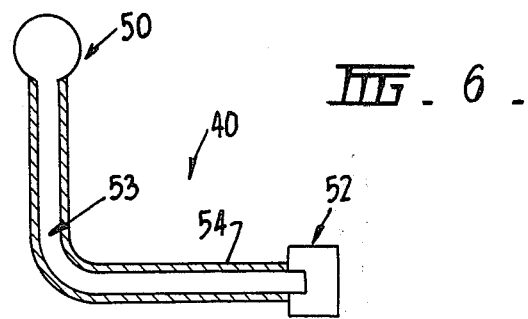
FIG. 6 is a cross-sectional view of a detecting pen for use in this embodiment.

The detecting target 40 shown in FIG. 6, has a spherical tip 50 with a matted surface. The tip 50 is connected to a photoelectric sensor 52 via a light pipe 53 enclosed in a light tight sheath 54. Light from a laser beam enters the matted tip 50 and is conveyed by the light pipe 53 to the sensor 52 which produces as a result electrical signals characteristically being smooth unidirectional pulses. Alternative detecting targets with greater sensitivity may be used. For example, targets of appropriate shape could be formed directly from a light sensitive semiconductor material or from a grid of such materials. Pen tips composed of such materials may be used in the two-dimensional digitizer.

The three-dimensional digitizer of this embodiment operates in a similar manner to that described for the embodiment of FIGS. 1 to 4. Referring to FIG. 7, an input signal comprising an electrical pulse train generated by a master clock 64 with a stable frequency of some megahertz is applied to counting registers 65, 66 associated with the laser beam 43. The registers 65, 66 commence counting when a pulse signal is received from the diode 48. When the beam 43 strikes the target (the detecting target 40) in the environment 44 an initial pulse generated thereby slows the count in register 66 to one half the normal rate for the duration of the impingement of the beam 43 on the target 40. The register 66 stops counting when the beam 43 leaves the target 40 so that the register 66 has a count in proportion to the elapsed time between the beam 43 striking the diode 48 and the beam striking the target 40. The reduction in the counting rate for the duration of time the beam 43 impinges on the target 40 effectively provides information on the centre of the beam 43 in relation to the centre of the target 40 and acts to counteract inaccuracies which would otherwise arise due to the finite width of the beam 43 and the target tip 50.

The register 65 continues counting at the megahertz rate until the beam strikes the second diode 49.

Similarly, registers associated with the beams 51 and 61 measure the elapsed time of the beams 51 and 61 for both the complete sweeps between the relevant sweep start and stop diodes 58, 59 and 68, 69 respectively and between the start diodes 58, 68 and the target in the working environment 44.

If the rotational speeds of the mirrors 42, 46, 47 do not change significantly during any sweep, the bearings of the target relative to the beams' centres of rotation can be digitized by running-up a count during the time it takes from the start of each sweep to the point where each target is, as against the count for the full sweep from start to finish. The sweep start and stop indicator diodes positioned at the edges of the environment 44, together with an appropriate logic network, keep track of each sweep and direct counts from the master clock to the individual registers associated with the particular sweep. The three rotating mirrors 42, 46, 47 are synchronized so that no more than one beam is sweeping the working environment at any given time. In an alternative arrangement, the individual beams employ laser light of different wavelengths so that two or more beams can sweep the environment concurrently. Any ambiguity about which beam is striking a target is eliminated by using several detectors (each sensitive to one of the laser wavelengths) in conjunction with each target.

The bearing of a target from each of the rotating mirrors 42, 46, 47 is calculated accurately by comparing the number of counts obtained from the whole sweep and the number of counts from the start of that sweep to the position of the target which, when hit by the laser beam, will stop counts going into a particular register. In this way there is compensation for variations in the actual speed of sweep. Speed variations within a given sweep may lead to errors in determining the target bearing. To reduce the sensitivity of such variations, a separate clock for the registers associated with each beam may be synchronized with pulses generated by a shaft encoder mounted on the axis of the appropriate rotating mirror: this approach can also be used in the two dimensional case.

When all registers have stopped counting, a signal is passed to a digital computer associated with the digitizer to indicate that a new position has been digitized. The contents of the register are made available to the computer over the same bussed data lines one after the other. The digitizer will hold any count in any register until the computer signals that it is ready to accept, and on sending out a complete set of data for positions of the targets, will reset all registers and start to fill them with counts for the new target positions.

The position of the target is simply deduced using the relevant bearings from the axis of each rotatable mirror together with the known positions of the mirrors and the sweep start and stop indicator diodes.

The three dimensional orientation of an object within the working environment 44 may be determined from the calculated positions of three or more targets attached to this object. For this purpose counting registers are associated with each target so that, during a single sweep of, for example, beam 43, the time elapsed between the start of the sweep and each target is separately counted.

In some applications it may be desirable to employ more than three rotating beams for the purposes of (I) checking and/or improving the accuracy of positions obtained, and (II) providing for the possibility of one ore more beams being obscured by objects in the working environment.

What we claim is:

1. A digitizing device comprising means for generating three beams of light, means for spreading each beam to a fan-shaped beam, means for moving each fan-shaped beam through a working environment in a direction at right angles to the plane on each beam and at right angles to each other, light-sensitive means in said environment which gives rise to electrical signals when light is incident thereon, and positioning means responsive to the electrical signals to relate the position of the light-sensitive means in the environment to the relative positions of the light beams when striking the light-sensitive means during each sweep through the working environment.

2. A device according to claim 1 wherein each fan-shaped beam is reflected from a rotatable convex reflector which spreads a substantially cylindrical beam to the fan-shaped beam, rotation of the convex reflector causing the fan-shaped beam to sweep through the working environment.

3. A device according to claim 1 wherin the light-sensitive means comprises at least one detector having a translucent, spherical tip and a photosensitive semiconductor connected to the tip by a shielded light pipe, said semiconductor producing said electrical signals when light from one of the fan-shaped beams strikes the tip.

4. A device according to claim 1 wherein said positioning means includes three pairs of light-sensing elements each pair being associated with one of the fan-shaped beams and positioned adjacent the boundaries of the working environment to produce electrical pulsed signals when struck by the associated light beam but being shielded from the other light beams, said pairs of elements defining reference positions in relation to the working environment for the associated light beam.

5. A device according to claim 4 and further including a pair of counter means associated with each light beam, means for causing the counters of each pair to count at a constant rate, means for simultaneously starting both counters of each pair when the associated light beam strikes one of the light-sensing elements, means for stopping one of the light-sensing elements, means for stopping one of the counters of each pair when the associated light beam strikes the light-sensitive means and means for stopping the other of each pair when the associated light beam strikes the other of the associated light-sensing elements.

6. A device according to claim 5 further including means to reduce the counting rate of the other counter when the associated light beam is first incident on the light-sensitive means, and means to stop the first counter when the light beam is no longer incident thereon.

7. A device according to claim 1 wherein the light beams are generated by a laser.

8. A device according to claim 1 wherein two or more light beams sweep the working environment simultaneously or in sequence.

9. A device according to claim 1 further including a digital computer having means to plot digital coded coordinates of the light-sensitive means to determine the relative position thereof in the working environment for any number of sweeps of each of the light beams.

10. A digitizing device comprising means for generating at least one beam of light of circular cross-section, means for spreading each said beam to a fan shape, means to cause at least one of said fan-shaped beams, to sweep across a working environment from at least two directions; light-sensitive target means which gives rise to electrical signals when light is incident thereon; and means responsive to the electrical signals of the said light-sensitive target means to relate the position of said light-sensitive target means in the working environment to the relative position of the fan shaped light beams when striking light-sensitive reference means during each sweep thereof through the working environment.

11. A device according to claim 10 wherein said means for causing the fan shaped light beam to sweep across the working environment comprises a rotatable reflector and two fixed reflectors located adjacent peripheral boundaries of the environment, means for directing the generated light beam onto the rotatable reflector which thereby causes the beam to sweep across the environment on rotation of the reflector, each said fixed reflectors further reflecting the rotating beam to cause additional sweeps of the beam across the environment on a single rotation of the rotatable reflector, characterised in that at least one of the rotatable reflector and the two fixed reflectors are of convex shape.

12. A device according to claim 11 wherein the light-sensitive target means comprises a detector pen having a part-spherical tip of translucent material, a light pipe connected to the tip and a photosensitive semiconductor on the other end of the light pipe and producing pulsed electrical signals when light from said beam is incident on the tip.

13. A device according to claim 12 wherein light-sensitive reference means, which give rise to electrical signals when struck by the said fan-shaped beam or beams, are positioned adjacent peripheral boundaries of the environment to define reference points to which the position of the light-sensitive target means is related through association of the movement of the said light beam sweeps between the said light-sensitive reference means and the respective electrical signals of the said light-sensitive reference means and the detector pen.

14. A device according to claim 13 and further including a pair of counters, means for supplying each counter simultaneously with an electrical pulse train, means for starting both counters when the said fan-shaped light beam sweeps past a reference position in the environment, means for stopping one of the counters when the light beam sweeps past a second reference position.

15. A device according to claim 14 further including electrical circuit means to slow the first counter to one half the counting rate of the second counter when the light beam is first incident on the detector pen tip and to stop the first counter when the light beam is no longer incident on the tip.

16. A device according to claim 15 wherein the rotatable reflector is caused to rotate at a substantially constant rate and a pulse train is generated by a master clock of a stable frequency.

17. A device according to claim 10 wherein any light beam is generated by a laser.

18. A digitizing device comprising means for generating at least one beam of light of circular cross-section; means to cause at least one of the beams of light, to sweep across a working environment from at least two directions; light-sensitive target means which gives rise to electrical signals when light is incident thereon; and means responsive to the electrical signals of the light-sensitive means to relate the position of said means in the working environment to the relative position of the light beams during each sweep thereof through the working environment, and further including a pair of counters, means for supplying each counter simultaneiously with an electrical pulse train means for starting both counters when the light beam sweeps past a reference position in the environment, means for stopping one of the counters when the light beam sweeps past a second reference position, and further including electrical circuit means to slow the first counter to one-half the counting rate of the second counter when the light beam is first incident on the light-sensitive target means and to stop and first counter when the light beam is no longer incident on the said target means.

19. A device according to claim 18 wherein the light-sensitive target means comprises a detector pen having a part-spherical tip of translucent material, a light pipe connected to the tip and a photosensitive semiconductor on the other end of the light pipe and producing pulsed electrical signals when light from said beam is incident on the tip.

20. A device according to claim 18 wherein any light beam is generated by a laser.

21. A device according to claim 18 wherein a rotatable reflector is used to cause the beam to sweep across the working environment such reflector rotating at a substantially constant rate and wherein the said electrical pulse train is generated by a master clock of a stable frequency.

* * * * *

UNITED STATES PATENT OFFICE
CERTIFICATE OF CORRECTION

PATENT NO. : 3,898,445
DATED : August 5, 1975
INVENTOR(S) : MacLeod, et al

It is certified that error appears in the above-identified patent and that said Letters Patent are hereby corrected as shown below:

Foreign Priority Application Data:

Australian Patent Applications PB 1430/72
Filed: November 30, 1972

Australian Patent Application PB 3941/73
Filed: July 4, 1973

Signed and Sealed this third Day of February 1976

[SEAL]

Attest:

RUTH C. MASON
Attesting Officer

C. MARSHALL DANN
Commissioner of Patents and Trademarks